April 7, 1959 F. J. CARSON 2,880,553
METHOD OF BENDING AND CUTTING GLASS SHEETS
Filed Sept. 19, 1956 2 Sheets-Sheet 1

INVENTOR.
Frank J. Carson
BY
Nobbe & Swope
ATTORNEYS

April 7, 1959  F. J. CARSON  2,880,553
METHOD OF BENDING AND CUTTING GLASS SHEETS
Filed Sept. 19, 1956  2 Sheets-Sheet 2
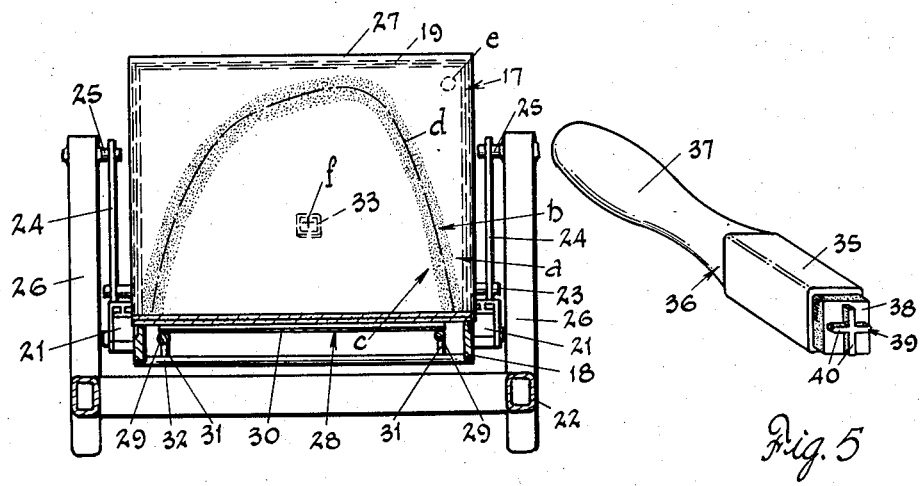
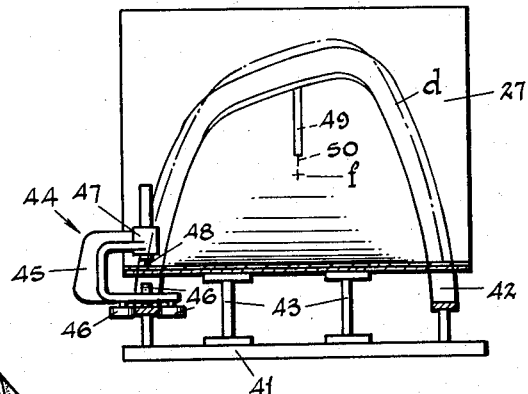
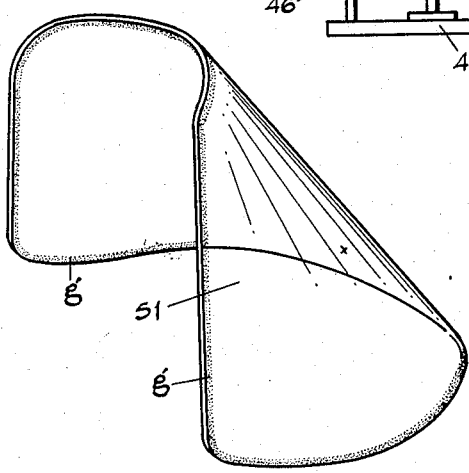
INVENTOR.
Frank J. Carson
BY
Nobbe & Swope
ATTORNEYS

United States Patent Office 2,880,553
Patented Apr. 7, 1959

2,880,553

METHOD OF BENDING AND CUTTING GLASS SHEETS

Frank J. Carson, Toledo, Ohio, assignor to Libbey-Owens-Ford Glass Company, Toledo, Ohio, a corporation of Ohio Application September 19, 1956, Serial No. 610,824

4 Claims. (Cl. 49—79)

The present invention relates generally to the bending and cutting of glass sheets, and more particularly to an improved method of bending and cutting glass sheets having a compression pattern therein to properly orient said pattern with respect to the cut sheet edge.

It is now known that the peripheral edge or margin of a glass sheet will be stronger and more resistant to chipping or fracture if a compressional stress is developed in such marginal areas. Accordingly, to produce suitably edged glass articles, such as automobile windshields, which in keeping with the design of modern cars are bent to increasingly sharp curvatures, provision is made in the molds by which the glass sheets are bent to orient the known stresses, such as tension and compression, and to develop a suitable outline in the sheets that will possess compressional stress.

Since glass sheets to be used for automobiles are usually bent in blank size and subsequently pattern cut, it is necessary to carefully orient the bent sheet on the cutting machine so that the path of the scoring tool will pass through an area of the sheet that is in compression. Since stress areas in the bent sheets are invisible, this has proved extremely difficult to accomplish.

The object of the invention is to provide a method of producing a pattern-cut bent glass sheet having edge stress therein from a bent blank size glass sheet.

A further object of the invention is to provide a method of bending a blank size glass sheet and forming a compression stress in a portion of the bent sheet, marking the bent sheet, and then orienting the bent sheet on a cutting machine to pattern-cut the sheet along the portion thereof in compression.

Other objects and advantages of the invention will become more apparent during the course of the following description when taken in connection with the accompanying drawings.

In the drawings, wherein like numerals are employed to designate like parts throughout the same:

Fig. 4 is a transverse sectional view taken along the line 4—4 of Fig. 2 and showing a pair of bent and marked glass sheets before their removal from the bending mold;

Fig. 5 is a perspective view of a suitable marking tool for marking the glass sheets;

Fig. 6 is a schematic view of a cutting machine for cutting the bent glass sheets; and Fig. 7 is a perspective view of a bent glass sheet when cut.

Briefly stated, the present invention comprises a method of producing pattern-cut bent glass sheets having a marginal edge stress therein from blank size glass sheets in which a pair of blank size glass sheets are first heated and then bent into conformity with the shaping surface of a bending mold. After being bent, portions of the sheets are cooled at a different rate than other portions to establish a compression stress in the bent sheets which are then marked prior to being removed from the mold. After being marked, the bent sheets are located on a cutting machine and oriented thereon by means of the mark whereby the cutting machine is able to accurately pattern-cut the sheets through the areas thereof in compression.

Figure 1:
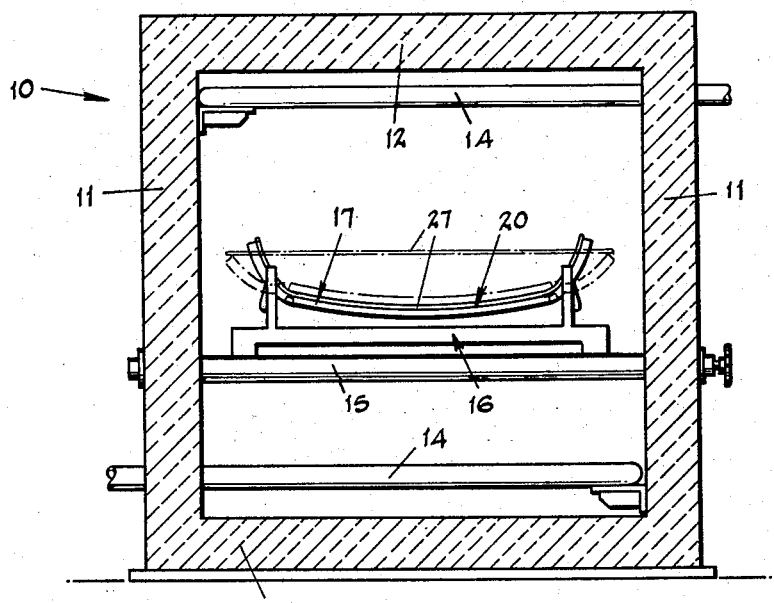
Fig. 1 is a transverse section through a bending furnace in which glass sheets may be bent.

With reference now to the drawings, there is shown in Fig. 1 a conventional glass bending furnace 10 comprising vertically disposed side walls 11, a roof 12 and a bottom wall 13. The furnace may be equipped with any suitable heating means such as radiant heating tubes 14 that extend transversely of the furnace above and below power-driven rolls 15 on which glass bending apparatus, generally designated by the numeral 16, is carried through the furnace 10, and thence through an annealing lehr which, though not shown, will be understood to be located at the end of the bending zone of the furnace 10 and preferably comprises a continuation thereof.

The bending apparatus 16 comprises a substantially rectangular mold 17 having a shaping surface of desired curvature and in accordance with customary bending procedures, flat glass sheets are supported upon the mold and softened by heat until they bend downwardly into conformity with the mold shaping surface. As here shown, the mold 17 comprises a central section 18 and end sections 19 each of which has a portion of the shaping surface 20 formed thereon. The mold end sections are pivotally connected to the central section by hinges 21, and the entire mold 17 is carried on a rack or base 22 by transverse rods 23 secured to the end sections 19 and supported at their ends in links 24. The links 24 are swingably supported at their upper ends on pins 25 that are fixed in posts 26 which form a part of the base 22 and are disposed in the respective corners thereof.

By means of the hinges 21 and rods 23, the end mold sections 19 are adapted to be moved from a closed position, shown in full lines in Fig. 1, to an open position, indicated in broken line. In the open position, the mold supports one or a pair of flat glass blanks, or rectangular sized sheets 27 in a horizontal position prior to the bending thereof. As the mold and glass sheets are passed through the furnace, the sheets become softened upon reaching a temperature in the neighborhood of about 1100° F. and tend to sag. At this time, the mold end sections swing upwardly and inwardly and thus assist in bending the sheets into conformity with the shaping surfaces 20 on the central and end mold sections.

Figure 2:
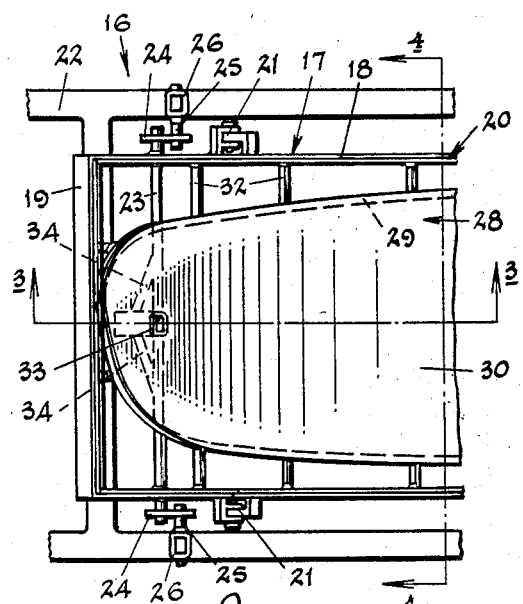
Fig. 2 is a fragmentary plan view of one end of a bending mold built in accordance with the invention.
Figure 3:
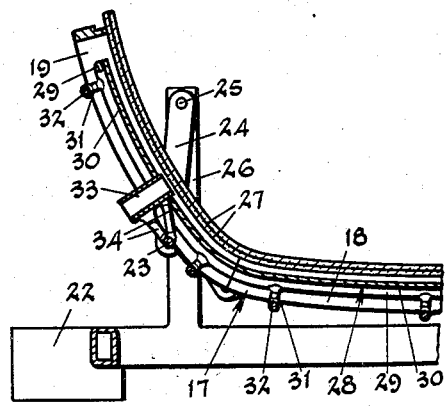
Fig. 3 is a fragmentary longitudinal section of the mold taken along line 3—3 of Fig. 2.

After the glass sheets have been bent, the bending mold is moved into an annealing zone wherein the sheets and mold are subjected to the influence of modulated cooling air which gradually reduces the temperature of the glass sheets to substantially room temperature. However, it has been found that the mold cools at a relatively slower rate than the glass and thus the shaping surface 20 of the mold retards the cooling of the marginal edge portions of the glass sheet in contact therewith and thus produces marginal areas of tension $a$ in the glass sheets, as shown in Fig. 4, while the marginal portions $b$ located inwardly thereof are usually in compression. In order to definitely establish this compression area, a heat absorbing member is employed in combination with the mold and has the effect of retarding the cooling of the centrally disposed areas $c$ of the glass sheets. For this purpose, a metallic heat absorber or shield 28 is employed. The shield is of substantially the same shape as the glass sheets to be subsequently pattern-cut from the substantially rectangular sheets or blanks 27 but is of a relatively smaller size. As shown in Figs. 2 and 3, the shield comprises a rail 29 and a thin metal membrane 30. The shield is formed of sections that are carried by the related sections of the mold so as to be movable therewith. The rail portions 29 which carry the membrane 30 may be supported on posts 31 carried by rods 32 that are fixed at their ends to the respective section of the mold.

As previously mentioned, the bending temperature of the glass sheets is somewhat in excess of 1100° F. After the bending mold enters the furnace annealing section, the temperature of the sheets is reduced through the critical annealing range; that is, from about 1000° F. to about 900° F. After the glass temperature is reduced below the lower limit of the critical annealing range, the effect of the mold on the glass is not too critical as far as setting up internal stresses in the glass is concerned.

While passing through the annealing zone, the marginal areas of the glass sheets indicated by the letter $a$, will be retarded in cooling by the slower rate of cooling of the shaping surface 27 of the mold and thereby placed in tension while the central portions of the sheet indicated $c$ will likewise be retarded in cooling by the shield 28 and thus also placed in tension. However, since the marginal portions of the glass sheets between the shaping surface 27 and the rail 29 of the shield are not materially affected, they will cool at a relatively more rapid rate and thus will have compression stresses. Accordingly, between areas $a$ and $c$ there will be located an area $b$ which will be in compression and which, while normally invisible, can under proper optical inspection be distinguished from the tension areas $a$ and $c$.

In subsequently cutting the glass sheets to pattern (desired size and shape) the said sheets are cut or scored along the line $d$ (Fig. 4) extending either through the compression area or along the outer edge thereof so that the edges of the cut sheets will be in compression.

In accordance with the invention and after the bending apparatus has passed through the annealing zone, the two glass sheets 27 are preferably secured together by spots of suitable adhesive $e$ inserted between the sheets at the corners thereof and then a reference mark $f$ is placed on the lowermost sheet before the sheets are removed from the bending mold. As will be later described, the cutting machine which cuts the sheets to pattern outline is provided with indexing means whereby, through use of the mark $f$, the glass sheets are properly oriented on the cutting machine so that the cutting head thereof may properly score the sheets along the compression area $b$.

To provide means for marking the bent glass sheets while they are in contact with the mold shaping surface, the mold 17 is provided with a pair of tubular members 33 supported on each of the rods 23 by suitably welded posts 34. The inwardly directed ends of the tubes are passed through the adjacent section of the shield 30 at each end of the mold and the tube is bodily positioned to axially locate the same substantially normal to the plane of the shield and the glass sheets 27.

The tube 33 is adapted to receive the shank 35 of a marking tool 36 when the tool is therein inserted by the handle portion 37. Opposite the handle 37, the shank 35 is recessed to contain a marking element such as a pad of ink-retaining rubber 38 which is formed on its exposed face to provide a cross 39 which corresponds to the mark $f$. While this type of reference mark having leg portions 40 extending at right angles to one another is herein illustrated, it will, of course, be apparent that any one of several suitable reference characters made by other means may be suitably employed. This marking operation may be carried out by the bending furnace personnel working at opposite sides of the furnace conveyor line and inserting a tool 36 into the oppositely disposed tubes 33 as the bending apparatus approaches the unloading area.

Since the lowermost glass sheet is marked while the two sheets are still on the mold, the distance from the marks $f$ to the compression area $b$ in the sheets is known. By properly orienting the marks $f$, and thus the compression areas $b$, on the cutting machine, a pattern-cut sheet having the edge portion thereof in compression may be accurately formed.

As diagrammatically shown in Fig. 6, the cutting machine is of the type disclosed in the co-pending application of J. R. Morris and F. E. Henning, Serial Number 428,778, filed May 10, 1954 to which reference is made, and comprises a base 41, having a template 42 in the form of a continuous rail-like track mounted thereon. Within the template 42, there is provided suitable means 43 for locating and supporting the pair of glass blanks 27 as a unit in proper relation to the template.

By means of a cutter unit or head 44, a score line, as indicated by the line $d$, is made successively in first the upper and then the lower glass blank. Briefly, this cutter head may comprise a frame 45 adapted to traverse the template 42 by means of suitably mounted rollers 46 and which supports a cylinder 47. Within the cylinder is an air-actuated mechanism by which the cutting wheel 48 is moved toward or away from the glass surface. Preferably, the frame 45 is supported by rollers 46 on the template 42 so that the cutting wheel 48 will at all times be positioned in a plane normal to the surface of the glass. In other words, the template 42 is so formed as to conform not only to the contour of desired curvature but also the outline of the pattern to be cut from the glass so that the cutter head 44 in following the template will describe a path substantially the same as the line $d$ and enclose the sheet portion in compression.

To properly orient the glass sheets 27 upon the template 42, a bar 49 extends inwardly from each end of the template and is provided with a pointer 50. The pointer 50 is located on the template, with respect thereto, so that when aligned with the marks $f$ on the glass sheets, the sheets are properly located on the cutting machine to enable the cutter head 44 to score the pattern outline along the line $d$.

In cutting the pair of marked glass sheets, the sheets are positioned on the supporting means 43 of the cutting machine and adjusted until the reference marks $f$ register with the pointers 50 at which time the line $d$ is located substantially midway in the compression area $b$. The cutting head 44 is then caused to traverse the template 42 and score the uppermost glass sheet to pattern outline which of course is properly positioned due to being secured to the lowermost sheet. After being scored, the uppermost sheet is removed and the lower sheet is then similarly scored.

After the scored blanks have been removed from the cutting apparatus and the salvage margins are broken away from the center area of each along the score line $d$, a glass sheet 51 of the desired outline and curvature, as seen in Fig. 7, will be obtained. As herein shown, the periphery of the sheet 51 is shaded, as at $g$, to indicate a marginal area of compression which can be ascertained upon inspection of the sheet with a polariscope equipped with color filter and, as previously noted, which will afford a stronger edge that is more resistant to chipping or fracture than those in tension.

In addition to providing for the proper scoring of the pattern-cut sheet with respect to the compression area in the blank size sheet, the present invention also insures that a blank size sheet, with or without a region of compression stress therein, is properly located on the cutting machine. It will be readily understood by those familiar with the art that if a blank size sheet is skewed with respect to the path of travel of the cutting head, the resultant pattern-cut sheet would not have the desired contour. However, in accordance with the present invention, by referencing a given spot or point on the glass sheet with respect to the mold shaping rail, and using the same spot or point on the sheet to reference or align the cutting head of the cutting machine, a correct contour in the pattern-cut bent sheet is assured.

It is to be understood that the form of the invention herewith described is to be taken as an illustrative embodiment only of the same, and that various changes may be resorted to without departing from the spirit of the invention or the scope of the subjoined claims.

I claim:

1. A method of producing a pattern-cut bent glass sheet, comprising bending a blank size glass sheet into conformity with the shaping surface of a mold, marking the bent sheet while in contact with the mold shaping surface to reference the marked sheet portion with respect to the mold shaping surface, and orienting the path of travel of a glass scoring tool with respect to the marked sheet portion to position said path of travel with respect to the sheet portions in contact with the mold shaping surface, and then moving the glass scoring tool in contact with the glass sheet to score said sheet to pattern outline.

2. A method of producing pattern-cut bent glass sheets having a marginal edge stress area from blank size glass sheets, comprising heating a blank size glass sheet to bending temperature and bending said sheet into conformity with the shaping surface of a mold, differentially cooling selected portions of the sheet inwardly of the sheet edge to form internal stresses in a sheet portion corresponding to the marginal edge area of the pattern size sheet to be cut from said blank size sheet in compression, placing a mark on the bent sheet before removing said sheet from the mold, positioning the marked sheet on a template type cutting machine having an indexing device and a glass scoring tool mounted for movement along a predetermined path which corresponds to the peripheral edge of the pattern-cut sheet to be cut from the blank size glass sheet, orienting the mark in the bent sheet with reference to the indexing device to position the path of travel of the cutting tool within the confines of the stressed portion of the sheet which corresponds to the marginal edge area of the pattern-cut sheet, and then moving said scoring tool along its path of movement and in contact with the glass sheet to score the blank size sheet to pattern outline.

3. A method of producing pattern-cut bent glass sheets as defined in claim 2, wherein a pair of blank size glass sheets are bent together and secured to one another before being removed from the mold.

4. A method of producing pattern-cut bent glass sheets as defined in claim 3, wherein one of the bent sheets is marked after the sheets are secured together.

References Cited in the file of this patent

UNITED STATES PATENTS

| | | |
|---|---|---|
| 1,713,854 | Meyer | May 21, 1929 |
| 1,988,565 | Owen | Jan. 22, 1935 |
| 2,177,324 | Long | Oct. 24, 1939 |
| 2,395,376 | Long | Feb. 19, 1946 |
| 2,500,105 | Weber | Mar. 7, 1950 |
| 2,551,279 | Miller | May 1, 1951 |
| 2,595,402 | Morris | May 6, 1952 |
| 2,608,799 | Babcock | Sept. 2, 1952 |
| 2,629,206 | Giffen et al. | Feb. 24, 1953 |
| 2,683,334 | Rugg et al. | July 13, 1954 |
| 2,746,209 | Walters | May 2, 1956 |

FOREIGN PATENTS

| | | |
|---|---|---|
| 644,410 | Germany | Feb. 26, 1935 |